United States Patent [19]
Brodetsky

[11] Patent Number: 4,777,827
[45] Date of Patent: Oct. 18, 1988

[54] DIGITAL PRESSURE GAUGE

[75] Inventor: Alexander Brodetsky, Toms River, N.J.

[73] Assignee: Sealed Unit Parts Co., Inc., Allenwood, N.J.

[21] Appl. No.: 143,801

[22] Filed: Jan. 14, 1988

[51] Int. Cl.⁴ .......................... G01L 7/04; G01L 9/10
[52] U.S. Cl. ..................................... 73/735; 336/30
[58] Field of Search ........................... 73/735; 336/30

[56] References Cited
U.S. PATENT DOCUMENTS 2,935,875  5/1960  Eggers et al. ........................ 73/735
4,531,416  7/1985  Loewenstern et al. ............... 73/735

Primary Examiner—Donald O. Woodiel
Attorney, Agent, or Firm—Roger A. Clapp

[57] ABSTRACT

Apparatus is disclosed in which a digital display is driven by an electronic output generated in response to field changes which occur when a transformer interacts with a magnetic core driven in a linearized path by a curved Bourbon tube in response to applied ambient pressure. The transformer is a simple variable transformer and the core is configured to follow a radial path within the field of the transformer.

5 Claims, 2 Drawing Sheets

DIGITAL PRESSURE GAUGE

BACKGROUND OF THE INVENTION

1. Field of the Inventions

The invention relates to display devices and pertains to those in which ambient pressure is digitally displayed by electronic means.

2. Description of the Prior Art

Displace devices for showing ambient pressure are well known in industry as, for example, needle gauges which move in response to expansion or contraction of one or more pressure responsive springs. Similarly, devices are known in which the ambient pressure is displayed in response to the interaction between a linear variable differential transformer and a magnetic core mounted on the end of a Bourbon tube.

The latter deliver acceptable results, but linear variable differential transformers are expensive. Moreover, such devices require sophisticated electronics and stable power supplies for satisfactory operation.

Accordingly, one object of this invention is to achieve a device which incorporates the advantages of a Bourbon tube as a transducer, but without the expense of a linear variable differential transformer and its attendant need for complicated electronics and stable power sources.

Electronic gauges which transduce pressure from a Bourbon tube into an electronic output require substantial temperature stability. Specifically, output of electronic components is susceptable to temperature variations as are the physical dimensions of the Bourbon tube. If left uncompensated, temperature variations will produce erratic results.

Accordingly, another object of this invention is to minimize the influence of temperature variations on the components of in an electronic pressure gauge.

SUMMARY OF THE INVENTION

In accordance with the preferred embodiment of the invention, a digital display is created by the output of electronic cicuitry generated in response to field changes which occur when the field of a transformer interacts with a magnetic core driven through the field by and along the radius of the free end of a circular Bourbon Tube as it moves in response to ambient pressure.

In accordance with an important feature of the invention, the transformer is a simple variable transformer and the core is shaped so as to allow it to follow the radial path of the free end of the Bourbon Tube as it moves within the field of the transformer.

A better understanding of these and other objects and features will be facilitated by reference to the following description of the drawing and detailed description of the invention.

BRIEF DESCRIPTION OF THE INVENTION

DETAILED DESCRIPTION OF THE INVENTION

Figure 1:
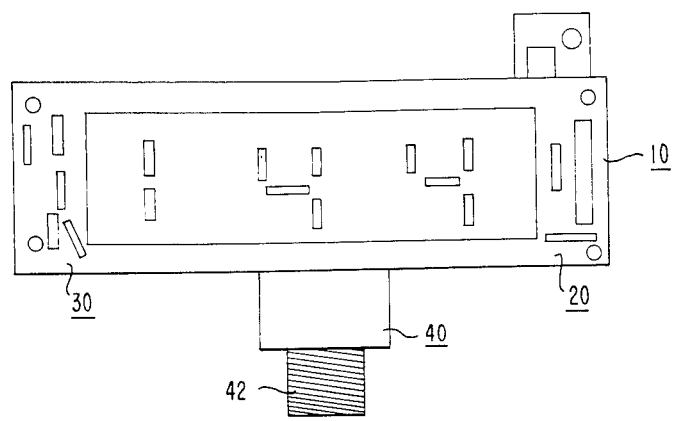
FIG. 1 is a front elevation view of the overall structure of the invention without a cover and illustrates the display portion.
Figure 2:
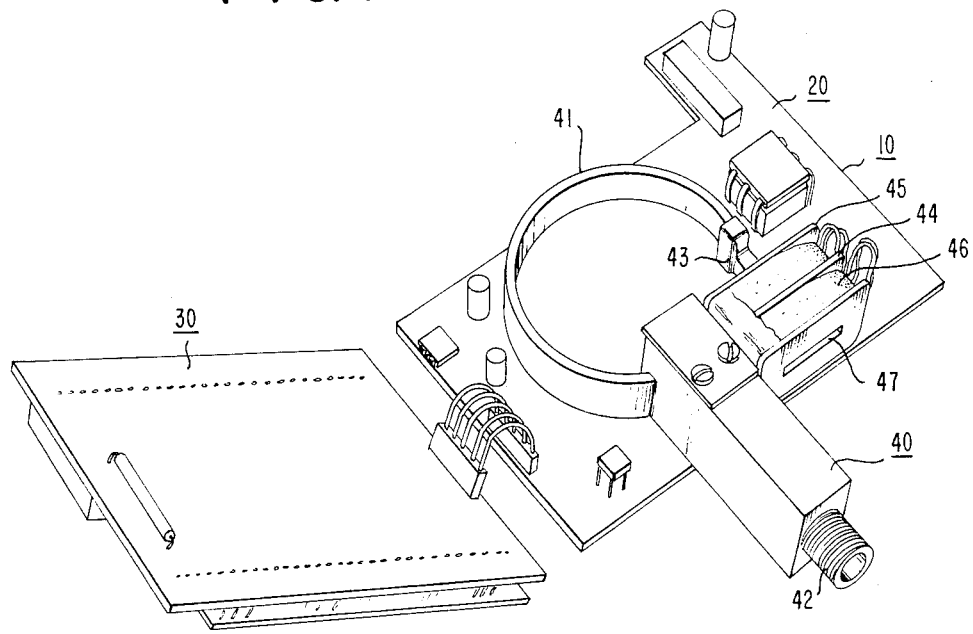
FIG. 2 is a front elevation view of the the invention as shown in FIG. 1 taken in perspective and with the display portion bent back to better illustrate interior components.

Referring to FIGS. 1 and 2, a display device assembly 10 is disclosed which comprises a support board assembly 20, a display unit assembly 30, and a Bourbon Tube assembly 40. The support board assembly 20 is printed circuit board of standard construction and supports the display unit 30, the Bourbon Tube assembly 40 and various electronic components (not numbered) so as to form a unitary device. The display unit 30, as best seen in FIG. 1, produces a digital display reflecting the ambient pressure detected by the Bourbon Tube assembly 40.

The Bourbon Tube assembly 40 comprises a circular Bourbon Tube 41, a stem 42, a core unit 43 and a transformer 44. One end of the Bourbon Tube 41 is affixed to the stem 42, which is hollow, and the other end is free to move when ambient pressure is transmitted through the stem 42 and into the fixed end.

Figure 3:
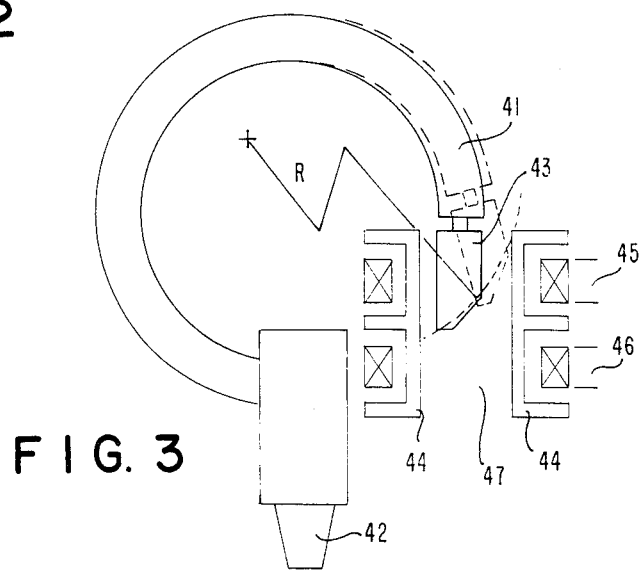
FIG. 3 is a schematic depicting interaction of the mechanical components of the invention.

As best seen in FIGS. 2 and 3, the transformer 44 is a simple variable transformer comprising a primary coil 45, a secondary coil 46 and a core space 47. The primary coil 45 is connected to a power source so that the secondary coil 46 will electrically respond when the magnetic field in the core space 47 is disturbed.

As further seen from FIGS. 2 and 3, the core unit 43 is affixed to the free end of the Bourbon Tube 41 and is adapted to move within the field of the core space 47. Moreover, it is made of a ferromagnetic material and shaped so that its free surface will traverse the radius of the circular Bourbon Tube 41 as the free end moves. The advantage of this arrangement is that the output of the secondary field 46 due to the movement of the core unit 43 within the field of the core space 47 is linearized.

All of the components mounted on the support board assembly 20 are attached by the use of surface mounted technology. As a consequence, the effect of changes in thermal ambient are minimized. Moreover, the circuitry which drives the display unit 30 includes a portion which further compensates for temperature changes.

Figure 4:
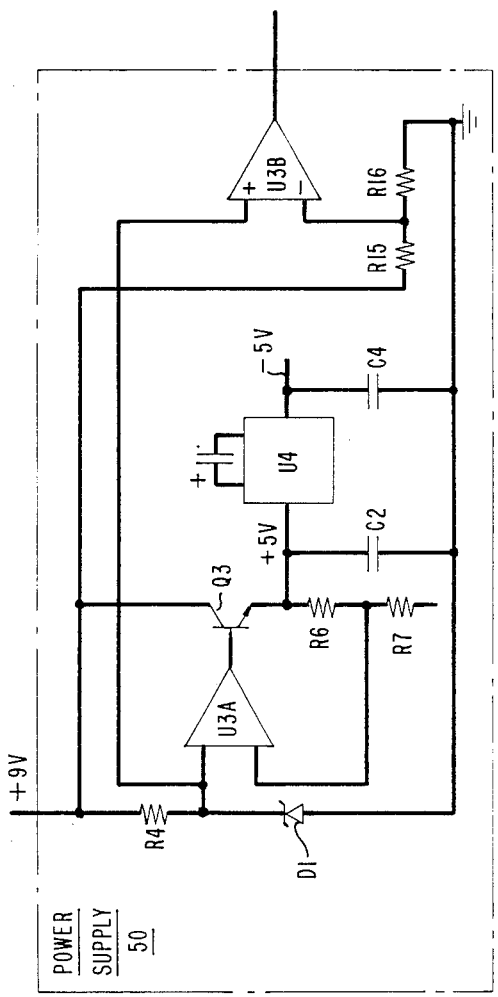
FIG. 4 is a schematic depicting the electronic circuitry of the invention.
Figure 4:
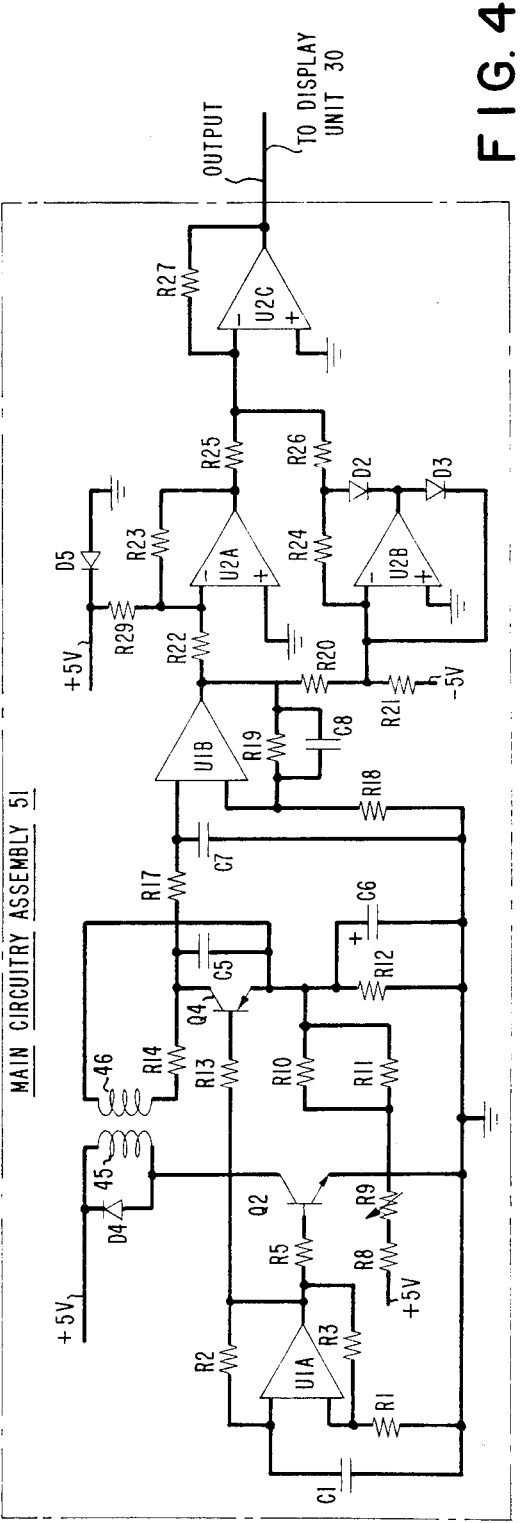

The circuitry, as best seen in FIG. 4, comprises a power supply 50 and a main circuit assembly 51. The power supply 50 is built around a Zener diode Q1, an operational amplifier U3A and a transistor Q3 so as to have 100 ppm thermal stability. The main circuit assembly 51 creates a square wave through U1A for input tp the primary coil 45, the output of U2A delivers the analog signal representing the pressure detected by the Bourbon Tube 41 and the output of U2B delivers a signal which cooperates with the output of U2A through U2C to produce a temperature compensated output electrical signal ready for delivery to the display unit 30.

In summary, a display device has been disclosed and described in which a linear temperature compensated analog signal is delivered to the display surface through a simple variable transformer. As a result, the device is inexpensive to make yet is accurate and reliable. While only one embodiment of the invention has been disclosed, it is merely representative of the principals of the invention and it is anticipated and expected that those skilled in the art will readily recognize and utilize other embodiments falling within the scope of the invention.

What I claim is:

1. In apparatus for displaying pressure as a digital readout, the combination comprising:
   support means;
   display means for illustrating an output in digital form when stimulated by electrical signals, said display means being mounted on said support means,
   motor means for generating motion in response to ambient pressure, said motor means comprising a circular Bourbon Tube mounted on said support means with one end free to move on a radius in response to ambient pressure variations;
   transformer means mounted on said support means and having a magnetic core field linking primary and secondary coils, said magnetic core field being adapted to generate an electrical output in said secondary coil when disturbed by a ferromagnetic core;
   ferromagnetic core means disposed in said core field and mounted on the free end of said motor means so as to disturb said core field when said Bourbon Tube moves, said ferromagnetic core means having a shaped surface adapted to track said radius whereby said ensuing electrical output from secondary coil will be linear, and
   electronic means mounted on said support means and including circuitry for generating said electrical signals in response to to said electrical output.

2. The combination in accordance with claim 1 wherein said magnetic core means comprises a block of ferromagnetic material, said block of ferromagnetic material is mounted on the tip of said Bourbon Tube, and the surface adapted to track said radius is chamfered.

3. The combination in accordance with claim 1 wherein said magnetic core means comprises a block of ferromagnetic material, said block of ferromagnetic material is mounted on the tip of said Bourbon Tube, and the surface adapted to track said radius is coincident with said radius.

4. The combination in accordance with claim 1 wherein all of the components are mounted on said support means by surface mounting technology.

5. The combination in accordance with claim 1 wherein said electronic means comprises a source of stable DC voltage, first circuit means, second circuit means and third circuit means, said first circuit means being adapted to convert movement of said magnetic core into a first electrical output, said second circuit means being adapted to generate a second electrical output compensated for the effects of ambient temperature and said third circuit means adapted to combine said first and second electrical outputs to produce said electrical signals.

* * * * *